Figure 1:
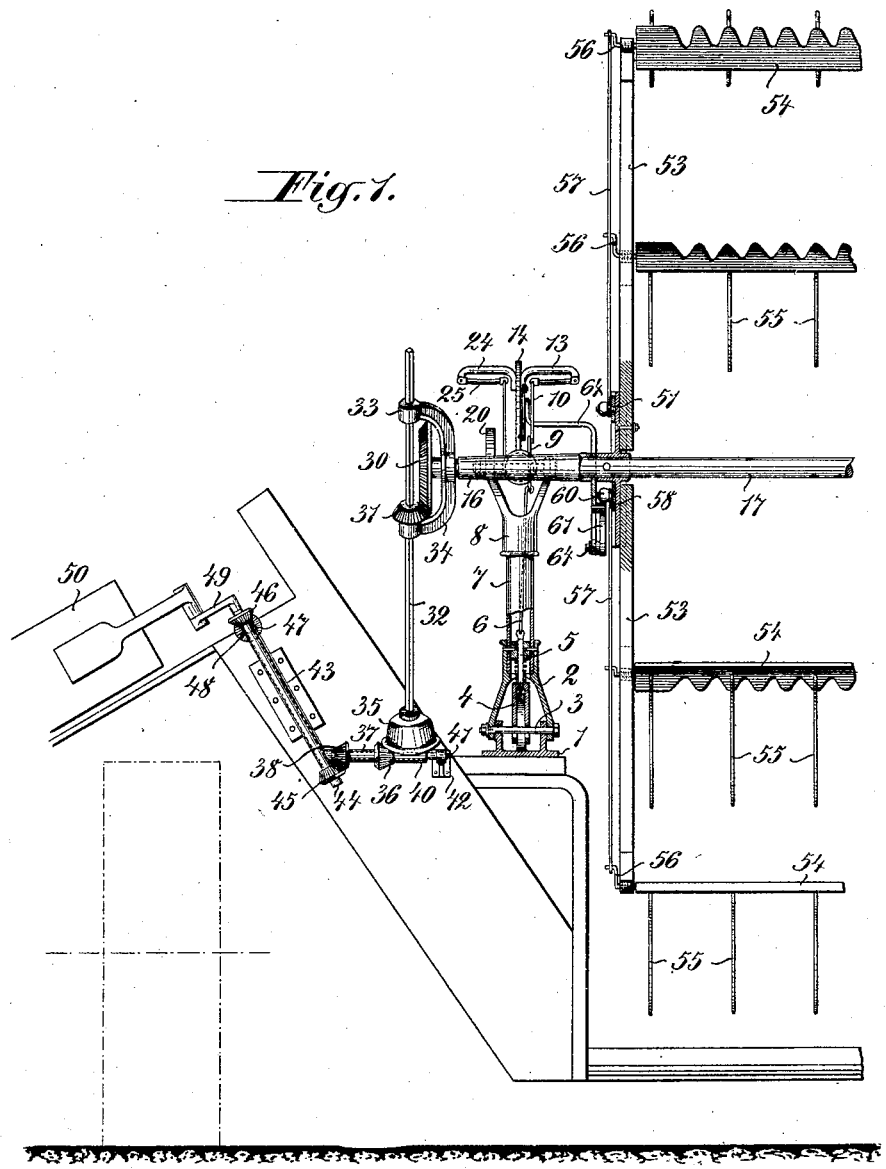

No. 880,104. PATENTED FEB. 25, 1908.
M. SCHILLER.
REEL FOR REAPING, MOWING, AND THE LIKE MACHINES.
APPLICATION FILED SEPT. 16, 1907.

4 SHEETS—SHEET 1.

Witnesses:
M. C. Lyddane
Edward R. Whitman

Inventor:
Moritz Schiller
By Julian C Dowell
his Attys.

No. 880,104. PATENTED FEB. 25, 1908.
M. SCHILLER.
REEL FOR REAPING, MOWING, AND THE LIKE MACHINES.
APPLICATION FILED SEPT. 16, 1907.
4 SHEETS—SHEET 2.
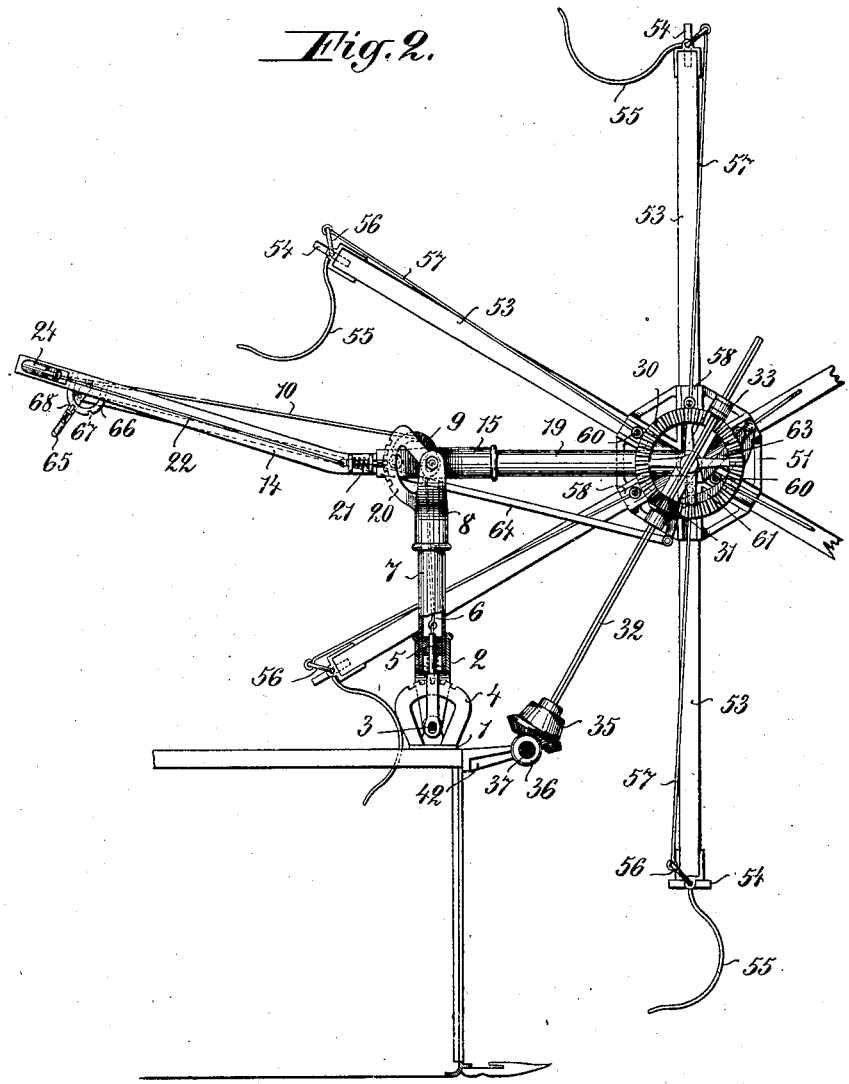
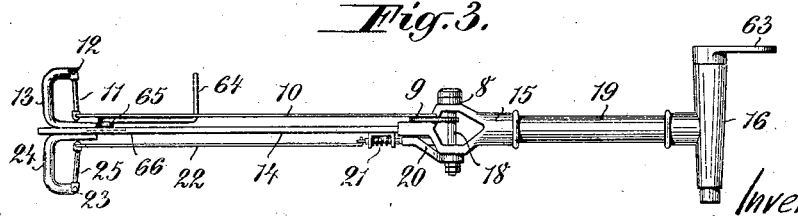

No. 880,104. PATENTED FEB. 25, 1908.
M. SCHILLER.
REEL FOR REAPING, MOWING, AND THE LIKE MACHINES.
APPLICATION FILED SEPT. 16, 1907.
4 SHEETS—SHEET 3.
Fig. 4.
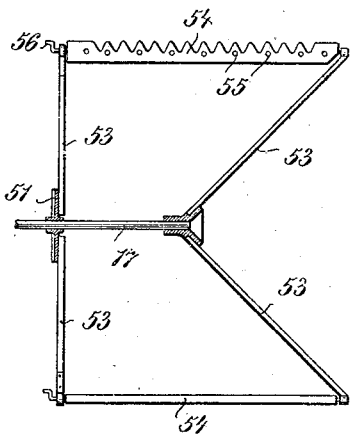
Fig. 5.
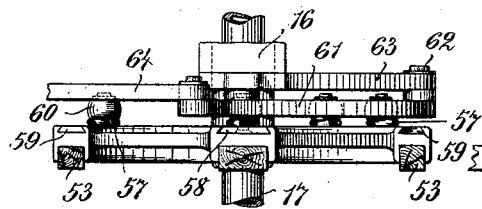
Fig. 7.
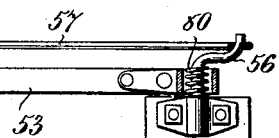
Fig. 6.
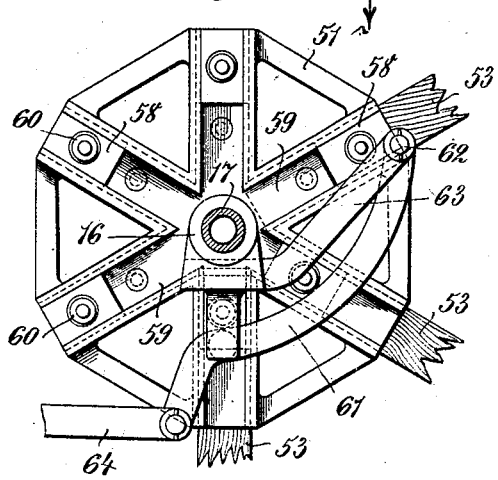
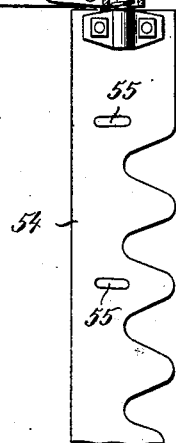
Witnesses:
M. C. Lyddane
Edward R. Whitman
Inventor:
Moritz Schiller,
By Julian C. Dowell
his Attys.

No. 880,104. PATENTED FEB. 25, 1908.
M. SCHILLER.
REEL FOR REAPING, MOWING, AND THE LIKE MACHINES.
APPLICATION FILED SEPT. 16, 1907.
4 SHEETS—SHEET 4.
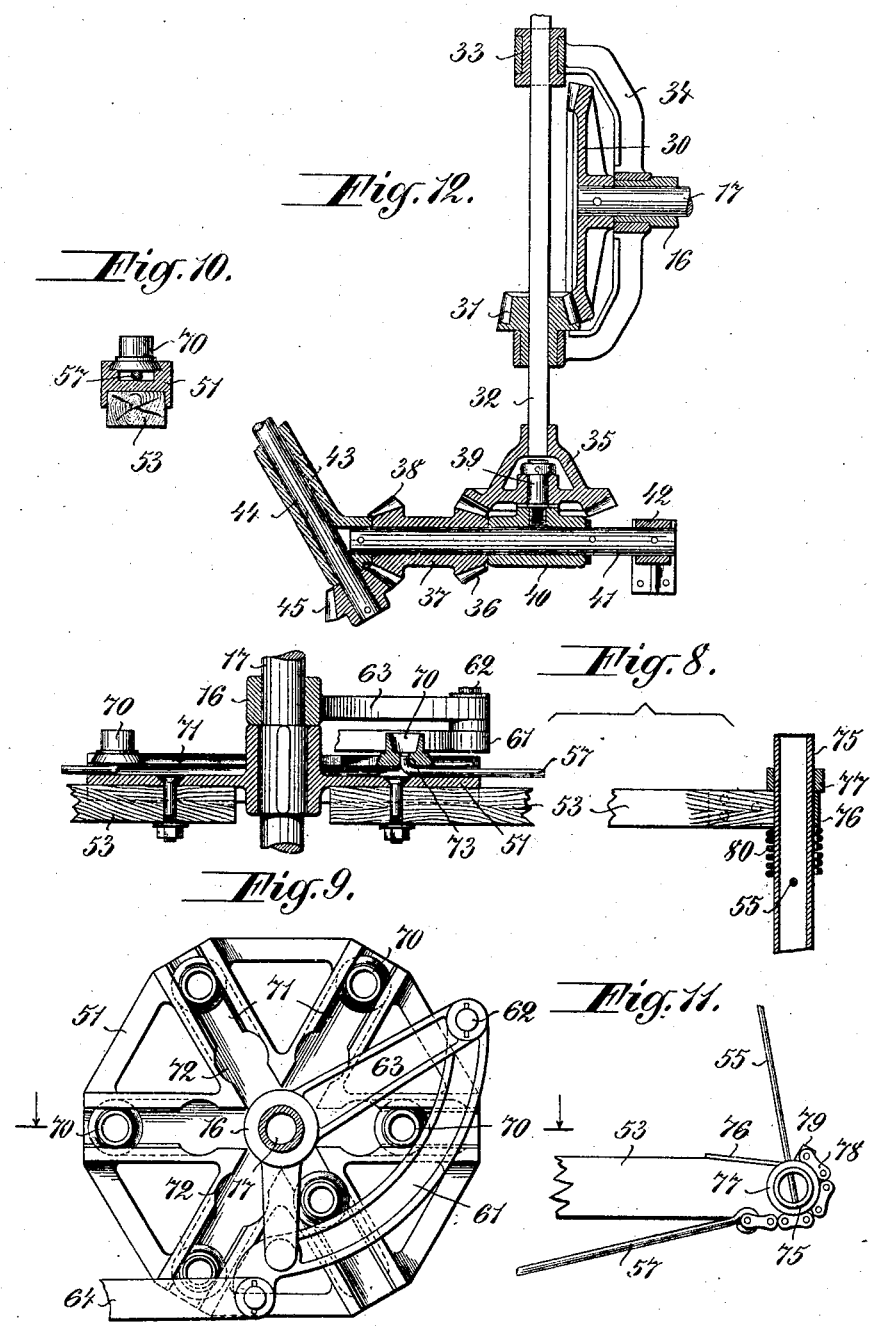

UNITED STATES PATENT OFFICE.

MORITZ SCHILLER, OF BERLIN, GERMANY.

REEL FOR REAPING, MOWING, AND THE LIKE MACHINES.

No. 880,104.  Specification of Letters Patent.  Patented Feb. 25, 1908.

Application filed September 16, 1907. Serial No. 393,087.

*To all whom it may concern:*

Be it known that I, MORITZ SCHILLER, of Berlin, Germany, a subject of the King of Prussia, and whose post-office address is No. 5 Landshuterstrasse, Berlin, Prussia, German Empire, have invented new and useful Improvements in and Connected with Reels for Reaping, Mowing, and the Like Machines, of which the following is a specification.

The present invention relates to the reels of reaping, mowing and the like machines and more particularly to reels fitted with tines, blades, or the like which are adapted to be moved or adjusted from the radial position into the tangential position so as to raise up corn that is hanging or lying down.

The object of the present invention is to provide means for facilitating this adjustment and consists essentially in operating the bars or rods effecting the adjustment of the tines or the like by slide shoes which are moved by a cam adapted to be set or controlled by a handle arranged on the main reel adjusting lever. This main lever has two other handles arranged beside each other so that by means of this single lever the reel can be moved forwards and backwards, up and down and the adjustment of the tines or the like effected by it.

A further portion of the invention relates to the driving of the reel by bevel wheels in such a manner that the bearing of the reel shaft can be moved so as to adjust the reel without necessitating chain gear or universal joints.

The accompanying drawings illustrate two modes of carrying out the invention:

Figure 1 is a front elevation of the reel and its gear, partly in section illustrating one mode of carrying out the invention; Fig. 2 is a side view corresponding to Fig. 1; Fig. 3 is a plan of the reel support and the adjusting lever for the same; Fig. 4 is a front view of the reel on a reduced scale, showing the arrangement of the tines and blades; Fig. 5 is a plan of the star nave of the reel; Fig. 6 is a side view of the same with the cam and the slots for adjusting the tines or the like; Fig. 7 is a plan of a part of a blade fitted with tines; Figs. 8 and 9 are a plan and side view respectively corresponding to Figs. 5 and 6 of a modified form of construction of this part; Fig. 10 is a detail sectional view showing a slide shoe according to the modification illustrated by Figs. 7 and 8; Fig. 11 shows a partial side view of a reel spoke with a blade and tines according to Fig. 7; Fig. 12 is a section through the driving mechanism of the reel shaft.

In Figs. 1, 2 and 3, 1 is a plate fastened to the frame of the machine. This plate is provided with a stationary toothed segment 4 and a forked member 2, pivoted to it at 3. A spring controlled sliding bolt 5 is arranged in the forked member 2 and is connected to a rod 6 situated in the interior of the supporting column 7 which latter has a second forked member 8 at the top. A curved lever 9 is arranged on a pivot 18 in the forked member 8 and a rod 10 connects the lever 9 with a handle 11, which latter is pivoted at 12 to a cross-piece 13 on an arm 14. This arm 14 is fitted to a holder 15 which is pivoted by means of the pin 18 to the forked member 8. An arm 19 with a bearing 16 for the reel shaft 17 is fastened to the other side of the holder 15. Thus by the forward and backward movement of the arm 14, the combined column 2, 7, 8, can be oscillated and by means of the handle 11, rod 10, lever 9, and rod 6 the bolt 5 can be fixed in the desired position on the toothed sector 4.

On the forked piece 8 a toothed segment 20 is formed and a spring controlled sliding bolt 21 is movably arranged on the arm 14. This sliding bolt 21 is connected by a rod 22 with a second handle 25 pivoted to a cross-piece 24. In this manner the holder 15 with arm 19 can be turned in the forked member 8 by the arm 14 to raise and lower the shaft 17 and can be fixed in the desired position on the toothed sector 20 by handle 24, rod 22 and bolt 21. The reel shaft 17 has a bevel wheel 30 fitted to one end, with which a bevel wheel 31 meshes. A rectangular shaft 32 passes through the bevel wheel 31 and is rotatively arranged with a bush 33 in a bracket 34 turning on the bush 16 (Fig. 12). At the lower end of the rectangular shaft 32 a bevel wheel 35 is fitted and meshes with a bevel wheel 36 integral with or connected to a sleeve 37 at the other end of which is a bevel wheel 38. The bevel wheel 35 turns on a pin 39 carried by a sleeve 40 which is rotatively arranged on an axle 41 around which the sleeve 37 can turn. The axle 41 is arranged at one end in a bearing 42 and at the other end in a tubular support projecting from a hollow sleeve 43, fastened to the frame of the machine.

A shaft 44, turning in the sleeve 43, is provided at its lower end with a bevel wheel 45 meshing with the bevel wheel 38 and at its upper end with a bevel wheel 46 (Fig. 1) driven by a bevel wheel 47 on a shaft 48. This shaft 48 is arranged on the frame of the machine and is driven in any suitable manner by the wheels of the mowing or reaping machine. Thus this shaft 48 drives the reel shaft 17 by the bevel wheels, 47—46, 45—38, 36—35 and 31—30. The shaft 44 can, as shown, be provided with a crank 49 for driving the shocking apparatus 50, which simultaneously with the shaft 17 of the reel is driven by the shaft 48. Now if the reel shaft 17 is moved forward or backward or is raised or lowered in the above described manner, then the rectangular shaft 32, as may be seen from Figs. 2 and 12, can follow this movement as the bevel wheel 35 rolls on the bevel wheel 37 and the rectangular shaft slides in the bevel wheel 31. The positive driving of the reel shaft is thus effected by the bevel gear described for any of the adjusted positions of the reel shaft.

The arrangement for adjusting the blades and tines of the reel is as follows:—In Figs. 1, 2, 5, 6 and 7 the star 51 fitted to the shaft 17 has fastened to it the spokes 53, to the ends of which the blades or like parts are pivoted, which in this form of construction consist of notched boards 54 to which curved spring tenons 55 are fastened. Cranks 56 are arranged at one end of the respective boards 54 and are connected to rods 57. The springs 80 Fig. 7 tend to maintain the cranks and the boards 54 in the radial position, that is in a line with the spokes. In order to move the boards 54 into the tangential position the rods 57 with their hooked shaped ends catch the pins of slide shoes 58 which run in dove-tailed grooves 59 on the nave 51 and are provided with rollers 60. A curve shaped guide or cam 61 which is pivoted at 62 to an arm 63 fixed to the box 16 of the reel shaft 17 is adapted to be placed in the normal path of the rollers 60. A rod 64 is connected to the other end of the guide or cam 61 and is pivoted to a lever 65 (Fig. 2) which is pivoted to the arm 14. To this arm a segment 66 with two holes 67 and 68 is fastened and the lever 65 is provided with a spring-controlled bolt adapted to be placed in one of the holes of the segment 66 so as to fix the lever 65. If the lever is locked in the hole 67 then the cam 61 is disengaged and the rollers 60 are not displaced. If the lever is locked in the hole 68 (Fig. 2) then the cam 61 is coupled up and is in the position shown in Figs. 2 and 6, and the rollers 60 on the rotation of the reel coming into the cam 61 displace the shoes 58, thereby pull on the rods 57 and by means of the cranks 56 turn the boards 54 into the tangential position.

In the form of construction according to Figs. 8 to 11 the shoes 70 are in the form of round rollers and the dove-tailed grooves 71 in the nave 51 have an expansion 72. The rods 57 are simply bent at their ends 73, each end being initially placed in the middle of the expansion 72, while the respective slide shoe 70 is placed thereon, the bent end entering a hole in the rear of the shoe. If the shoe is moved out of the expanded part 72 it cannot unhook from the rod (Fig. 8). In this form of construction the notched boards or blades of the previous example are replaced by tubes 75 which turn in eyes 76 in the spokes 53 and have a collar 77 on which is a lug 79 to which a chain 78 is attached.

The rods 57 are hooked in this chain. The tines 55 are passed through the tubes 75 and fastened to them, spiral springs 80 tending to hold the tubes and tines in the radial position. The turning of the same into the tangential position by the rods 77, shoes 70, cam 61, rod 64 and lever 65 is effected in the same manner as in the example first described. The term "reel-bars" is used in the claims to include either the notched bars or the tubes, or any style of reelbars whether in the form of blades or bars provided with tines.

What I claim, and desire to secure by Letters Patent of the United States, is:

1. In a reel for reaping machines, the combination with the reel-shaft, and rotatably-mounted reel-bars, of a nave fast on said shaft and having radially-arranged guides, rods connected at their outer ends with the reel-bars and having their inner ends movably connected with the guides in said nave, and means comprising a cam and parts connected to said rods adapted to engage said cam as the reel revolves so as to move said rods and thereby turn said reel-bars.

2. In a reel for reaping machines, the combination with the reel-shaft, and rotatably-mounted reel-bars, of a nave fast on said shaft and having radially-arranged guides, rods connected at their outer ends with the reel-bars and having their inner ends movably connected with the guides in said nave, and means comprising an adjustable cam and parts connected to said rods adapted to engage said cam as the reel revolves and thereby move said rods to turn said reel-bars, and means adapted for adjusting said cam.

3. In a reel for reaping machines, the combination with the reel-shaft, and rotatably-mounted reel-bars, of a nave fast on said reel-shaft having radial guides, shoes movable radially in said guides and having lateral rollers, rods connected with said shoes and with the reel-bars, and a cam arranged to be engaged by said rollers as the reel revolves for moving in the shoes and thereby turning said reel-bars.

4. In a reel of reaping machines the combination of a shaft, a star nave fastened on the said shaft, spokes fastened on the star nave, grooves radially arranged on the star nave, reel bars, rotatably mounted on the spokes, tines fastened on the reel bars, rods connected with the said reel bars, means adapted for guiding the said rods within the radial grooves of the star nave, an adjustable cam, means adapted for adjusting the said cam, a lever having a sleeve adapted for bearing the reel shaft, a pivotally mounted column adapted for supporting the said lever, handles fastened on the lever, means adapted for fixing the lever, and means adapted for fixing the pivotally mounted column, substantially as set forth.

5. In a reel of reaping machines the combination of a shaft, a star nave fastened on the said shaft, spokes fastened on the star nave, grooves radially arranged on the star nave, reel bars, rotatably mounted on the spokes, tines fastened on the reel bars, rods connected with the said reel bars, means adapted for guiding the said rods within the radial grooves of the star nave, an adjustable cam, means adapted for adjusting the said cam, a lever having a sleeve adapted for bearing the reel shaft, a pivotally mounted column adapted for supporting the said lever, handles fastened on the lever, a handle hinged with its one end to the handle of the lever with its other end to a rod adapted for fixing the lever, and a handle hinged with its one end to the handle of the lever with its other end to a rod adapted for fixing the pivotally mounted column, substantially as set forth.

6. In a reel of reaping machines the combination of a shaft, a star nave fastened on the said shaft, spokes fastened on the star nave, grooves radially arranged on the star nave, reel bars, rotatably mounted on the spokes, tines fastened on the reel bars, rods connected with the said reel bars, means adapted for guiding the said rods within the radial grooves of the star nave, an adjustable cam, a lever having a sleeve adapted for bearing the reel shaft, a pivotally mounted column adapted for supporting the said lever, handles fastened on the lever, a handle hinged with its one end to the handle of the lever with its other end to a rod adapted for fixing the lever, a handle hinged with its one end to the handle of the lever with its other end to a rod adapted for fixing the pivotally mounted column, a handle pivotally mounted on the lever near to the lever handle, a rod adapted for connecting the pivotally mounted handle with the adjustable cam, and means adapted for fixing the pivotally mounted handle, substantially as set forth.

7. In a reel of reaping machines the combination of a shaft, a star nave fastened on the said shaft, spokes fastened on the star nave, grooves radially arranged on the star nave, reel bars, rotatably mounted on the spokes, tines fastened on the reel bars, rods connected with the said reel bars, means adapted for guiding the said rods within the radial grooves of the star nave, an adjustable cam, means adapted for adjusting the said cam, a lever having a sleeve adapted for bearing the reel shaft, a pivotally mounted column adapted for supporting the said lever, handles fastened on the lever, a handle hinged with its one end to the handle of the lever with its other end to a rod adapted for fixing the lever, a handle hinged with its one end to the handle of the lever with its other end to a rod adapted for fixing the pivotally mounted column, a bevel wheel fastened on the reel shaft, a bevel wheel rotatably mounted on a bracket turning on the reel shaft bearing, a rectangular shaft passing through the said rotatably mounted bevel wheel, a bevel wheel fastened on the rectangular shaft, an axle, a sleeve rotatably arranged on the axle, a pin adapted for carrying the bevel wheel fastened on the rectangular shaft, a sleeve having a bevel gear meshing with the bevel wheel fastened on the rectangular shaft, a second bevel gear meshing with a bevel wheel mounted on a driving shaft, and means adapted for driving the said shaft, substantially as set forth.

In testimony whereof I have hereunto set my hand in presence of two subscribing witnesses.

MORITZ SCHILLER.

Witnesses:
 WOLDEMAR HAUPT,
 HENRY HASPER.